Aug. 10, 1965   R. A. LOSCHER   3,200,387
GAS CONTAMINANT SENSING DEVICE
Filed Aug. 11, 1961   2 Sheets-Sheet 2
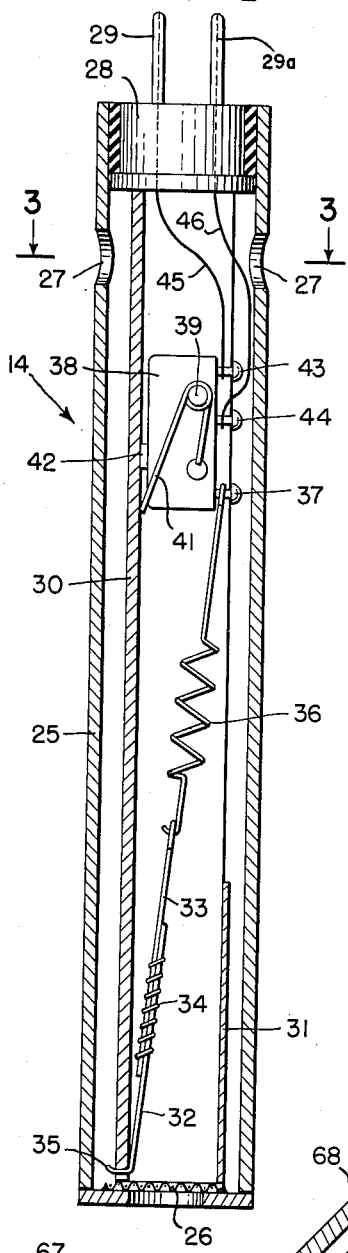
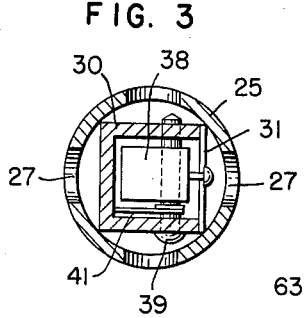
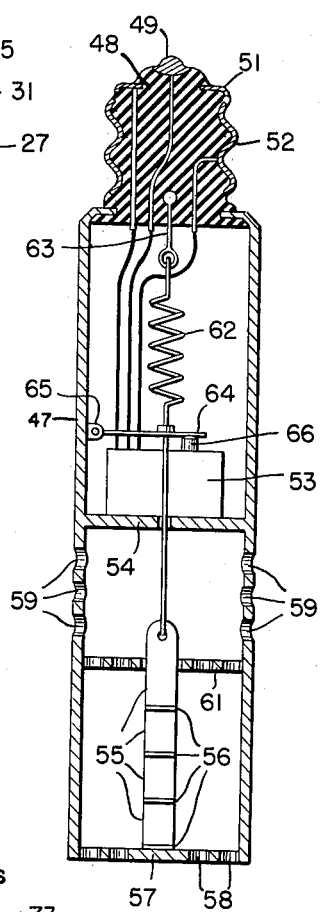
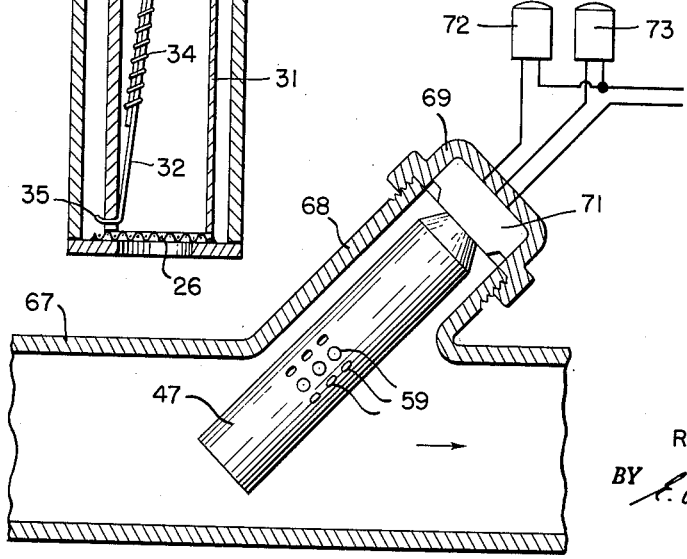
*INVENTOR.*
ROBERT A. LOSCHER
BY *E. Willford Mason*
ATTORNEY.

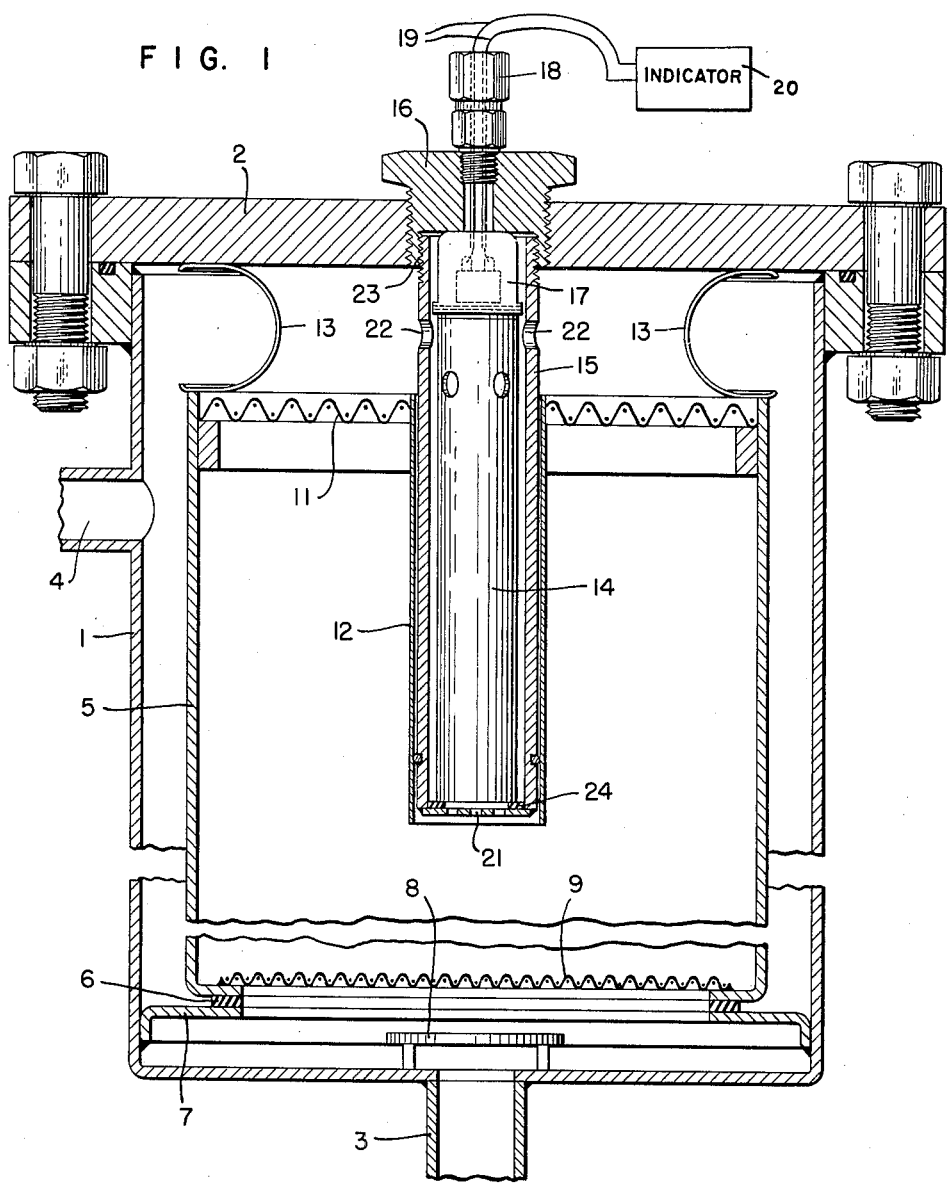

United States Patent Office 3,200,387
Patented Aug. 10, 1965

3,200,387
GAS CONTAMINANT SENSING DEVICE
Robert A. Loscher, Philadelphia, Pa., assignor to Selas Corporation of America, a corporation of Pennsylvania
Filed Aug. 11, 1961, Ser. No. 130,847
5 Claims. (Cl. 340—237)

The present invention relates to indicating devices, and more particularly to apparatus for detecting the presence of a contaminant in a gas.

Many industrial processes, and particularly those in the food and chemical industries, require clean air or other gas that is free of contaminants such as oil vapor, for example. Apparatus for producing such a gas is available, but so far as I am aware no inexpensive and practical means has yet been devised to detect a deterioration of the quality of the gas that is being produced. Some types of gas purifying equipment include a disposable cartridge with a material which will adsorb the contaminant. Such equipment should be provided with a device which will give an indication when the cartridge must be changed.

It is an object of the invention to provide apparatus which is responsive to the presence of a contaminant in a stream of gas.

It is a further object of the invention to provide apparatus which can be used to indicate when an adsorbent material in a gas stream should be replaced.

A further and more specific object of the invention is to provide a replaceable unit having an oil vapor sensitive element that can be used to detect and indicate the presence of oil vapor in a flowing stream of gas.

The various features of novelty which characterized my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a section through apparatus with which the detector is used,

FIG. 2 is a section through the detector,

FIG. 3 is a section taken on line 3—3 of FIG. 2,

FIG. 4 is a section through a modified form of detector, and

FIG. 5 shows another manner in which the detector can be used.

Referring to FIG. 1, there is shown an adsorbing apparatus generally of the type described in Krieble Patent No. 2,701,624. Such apparatus includes structure forming a metal chamber 1 which has a detachable top 2. Gas to be treated by having a contaminant removed is supplied to the chamber through an inlet 3, and is removed therefrom through an outlet 4. As the gas moves between the inlet and the outlet it passes through a disposable element consisting of a cannister 5 that is filled with a granular adsorbent material that will remove the contaminant from the gas. This cannister is placed in the chamber, with the lower end resting on a gasket 6 that is supported by a ledge 7 immediately above the bottom of the chamber. Gas flowing into the chamber through inlet 3 is dispersed across the bottom of the cannister by a baffle 8. The gas then travels through a screen 9, across the bottom of the cannister and through the adsorbent material therein to be discharged through a screen 11 at the top of the cannister. The upper screen 11 is provided with a sleeve 12 that extends down into the adsorbent material. The cannister is held in position in the chamber and against the gasket 6 by means of springs 13 that are attached to the top. It will be seen from the drawing that, when the top is attached to the body of the chamber, springs 13 will engage the edges of the cannister to force it against the gasket, and thereby prevent the flow of any gas around the cannister.

A detector unit is used to determine if impurities remain in the gas after it passes through the adsorbent material. This detector unit is shown herein as taking the form of a cylindrical probe 14 which is protected by a shield 15 that is fastened to the top 2 of the chamber. This shield is carried by a plug 16 threaded to the top 2. The plug has attached to it a fixture 17 which holds the probe and an adapter 18 through which wires 19 extending from the plug lead to in a conventional manner to an indicating instrument 20. Part of the gas passing through the adsorbent material will go through openings 21 in the bottom of shield 15, to pass through the detector unit and be discharged through openings 22 at the top of the shield. The detector unit is held in position by means to be described below in fixture 17. The shield 15 is then threaded by means of threads 23 into the plug 16 to bring the lower end of the unit tightly against a gasket 24 at the bottom of the shield. Thereafter in the operation of the apparatus a portion of the air flowing through the adsorbent will go through the detector unit, which is responsive to the contaminant in the air.

The detector unit 14, sometimes called a probe, consists of a tube 25 having an opening in the bottom thereof that is closed by a screen 26. Near the upper end of the tube there are provided exhaust openings 27, and the upper end of the tube is closed by means of a plug 28 which has prongs 29 and 29a extending from it. Fastened to the lower portion of the plug 28 is a channel member 30 which has its lower end bridged by a plate 31 to form a restricted path through which gas can pass. Located in this path is a detector element consisting of a pair of wires 32 and 33, which are joined together by a material 34 that will lose its binding effect or soften or become weaker in the presence of the contaminant. The lower end of wire 32 is bent as shown at 35, and extends through an opening formed in channel 30. The detector element consisting of wires 32 and 33 is held diagonally across the path by means of a spring 36, the lower end of which is fastened to wire 33, and the upper end of which is hooked over a pin 37 extending from a small switch 38. Switch 38 is pivoted for movement around a pin 39, and is biased by a spring 41 in a counterclockwise direction against the force of spring 36. This latter spring holds the switch in a position so that an actuating button 42 is pushed against the wall of channel 30 to hold the switch open. Terminals 43 and 44 extend from the switch and are connected by wires 45 and 46 to the prongs 29 and 29a.

In the operation of the device, if it is used, for example, to remove oil vapor from air, the cannister 5 will be filled with a granular adsorbent material such as activated carbon, which will remove oil vapor from the air. The material 34 used to join wires 32 and 33 will be of a type that will lose its strength or weaken in the presence of oil vapor. Such a material is carnauba wax. The probe is assembled with the wires 32 and 33 being held in position by the spring 36 so that switch 42 is closed. This assembly is then placed in shield 15 and attached to plug 16 in the top. It will be noted that the probe extends downwardly only a portion of the way through the activated carbon. Thus, when air to be cleaned is flowing from the bottom to the top of the cannister, oil vapor will be adsorbed until such time as the carbon is filled with oil to a level equal to the bottom of shield 15. Thereafter a small quantity of contaminated air will flow through the detector unit, with the remainder of the air flowing through the carbon surrounding tube 12. This small quantity of air, with its contaminating oil vapor flowing through the probe, will act on the wax so that it will no longer be strong enough to hold wires 32 and 33 together. When the wires are parted, spring 41 will pivot switch 38 so that the switch can close and close a circuit through the wires connected therewith to give an indication of any suitable and conventional type. Such an indication means that the adsorbent material in the cannister has reached the point where it should be replaced. Such a small amount of contaminated air will flow through the probe itself and out into the main stream through exit 4 before the switch is actuated that it can be neglected as far as the purity of the effluent air is concerned. It is noted above that as soon as the wires 32 and 33 have parted an indication will be made that the cannister needs changing. An operator can then complete this operation by removing top 2 from the chamber and inserting a new cannister. As the same time shield 15 will be removed from plug 16 and a new probe will be inserted in the shield so that the apparatus can rapidly be placed in operation. The probe can be used again by merely inserting a new detector element consisting of the wires 32 and 33 and the wax 34.

Another form which the detector unit or probe may take is shown in FIG. 4 of the drawing. In this case there is provided a tube 47, the upper end of which is closed by a base of insulating material similar to a base used on a three-way electric light bulb. This base is provided with three contacts 49, 51, and 52 that are connected by wires to the terminals of a small single pole, double throw switch 53 that is mounted on a partition 54 extending across the tube 47.

The detector element in this form is comprised of a plurality of blocks 55, which may be graphite, that are joined together by wax layers 56. The lower of these blocks is attached to the bottom 57 of tube 47 by means of wax. The bottom 57 has in it a series of openings 58 through which the air may flow to be discharged through openings 59 in the side of the tube. If desired, a perforated partition 61 can be used between the ends of that portion of the tube formed by bottom 57 and partition 54 in order to direct the flowing air more closely around the detector element. The upper end of the top block 55 is attached to the lower end of a spring 62, the upper end of which is attached to an abutment 63 molded in base 48. Intermediate the ends of the spring it is attached to a lever 64 that is pivoted at 65. It will be apparent that each of the layers 56 can be made of a material that is sensitive to a different contaminant.

When the detector unit is in operative condition, the arrangement is such that spring 62 is stretched by having its lower end attached to the upper block 55 in order to keep lever 64 against a switch button 66 to hold this button down and thereby close one of the sets of contacts in the switch. When the air flowing through the openings 58 contains in its enough oil vapor to cause the wax sections 56 of the detecting element to lose their strength, spring 62 will relax and permit lever 64 to move off button 66. When this occurs, the switch will operate to open the contacts that were previously closed and to close its other set of contacts.

Either of the detecting units or probes that have been described can also be used, for example, in a pipe through which air or other gas is flowing. Referring to FIG. 5, it will be seen that a pipe 67 is used as a conduit for the gas in which the impurities are to be detected. This pipe has in it a branch 68 that is closed by a cap 69. Fastened to the inside of the cap is a socket 71 that may be of the type to receive the plug of the unit shown in FIG. 4 or the prongs of the unit shown in FIG. 2. Assuming that the unit of the type shown in FIG. 4 is used, it will be threaded into socket 71. As the air flows through the pipe 67, a portion of the air will circulate through the detecting unit 47. When the contaminant in the gas reaches a dangerous point, the wax members 56 will permit the blocks 55 to separate to operate the switch. There is diagrammatically shown in this figure a circuit in which an indicator element 72, such as a light, will be energized when the gas flowing through pipe 67 is clean. When the gas contains too much of the impurities that are being detected by element 47, the switch will be actuated to de-energize indicator 72 and energize indicator 73, thereby warning an operator that attention is needed to correct the flow of gas through the pipe.

From the above it will be seen that I have provided apparatus which is sensitive to the impurities in a gas stream. The material holding the wires 32 and 33 of FIG. 2 or the blocks 55 of FIG. 4 together can be selected so that it will lose its strength in the presence of any desired impurity. For example, this material could be made of a flour and water paste if the impurity being detected is water vapor, since such a paste will weaken in water, and will permit the parts of the detector element to separate. In such a case the adsorbent would be silica gel.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for separating a contaminant from a gas which comprises a cannister having ends and containing a body of adsorbent of a predetermined depth from a first end, the adsorbent being adapted to adsorb the contaminant from the gas, means to direct gas to be cleaned through the cannister from said first to a second end, a detecting unit extending into said cannister from said second end a portion of said predetermined depth, means forming a path for gas through said unit, means located in said unit responsive to the presence of contaminant in said gas, an indicator, and control means operated by said responsive means for controlling said indicator means.

2. The combination of claim 1 in which said responsive means includes a pair of adjacent elements and material weakened by the contaminant to hold said elements together, means tending normally to separate said elements, said control means also including a switch, and means to operate said switch upon separation of said elements when said material has been weakened by the contaminant.

3. Apparatus for removing a contaminant from a gas comprising a container having ends, a bed of adsorbent material in said container through which the gas flows from a first end to a second end, said adsorbent having the property of removing the contaminant from the gas, a detector unit extending a predetermined distance into said bed of adsorbent from said second end, said unit including a switch, means normally biasing said switch to operate in one direction, a detector element holding said switch against the action of said biasing means to operate in the opposite direction, an indicator operated by said switch, said detector element including separable parts and a material that loses its holding power in the presence of the contaminant holding said parts together, and means forming a passage through said detector unit and past the detector element therein whereby gas flowing through the adsorbent from said first end to said second end will flow through said detector unit.

4. The combination of claim 3 in which the contaminant is oil vapor, the adsorbent is activated carbon and the material holding said parts together is carnauba wax.

5. The combination of claim 3 in which the contaminant is water vapor, the adsorbent is silica gel and the material holding said parts together is flour and water paste.

References Cited by the Examiner

UNITED STATES PATENTS

| | | | |
|---|---|---|---|
| 533,183 | 1/95 | Storrs | 200—142 |
| 1,201,241 | 10/16 | Berg. | |
| 1,995,107 | 3/35 | Schlatter | 200—61.06 |
| 2,299,815 | 10/42 | Gent | 200—61.03 |
| 2,306,509 | 12/42 | Talmey | 200—61.03 |
| 2,768,027 | 10/56 | Nelson | 137—67 |
| 2,908,896 | 10/59 | Homma | 340—227 |
| 2,991,793 | 7/61 | Whitlock et al. | 137—67 |

FOREIGN PATENTS

| | | |
|---|---|---|
| 146,829 | 12/03 | Germany. |
| 6,667 | 3/08 | Great Britain. |

NEIL C. READ, *Primary Examiner.*

ROBERT H. ROSE, *Examiner.*